UNITED STATES PATENT OFFICE.

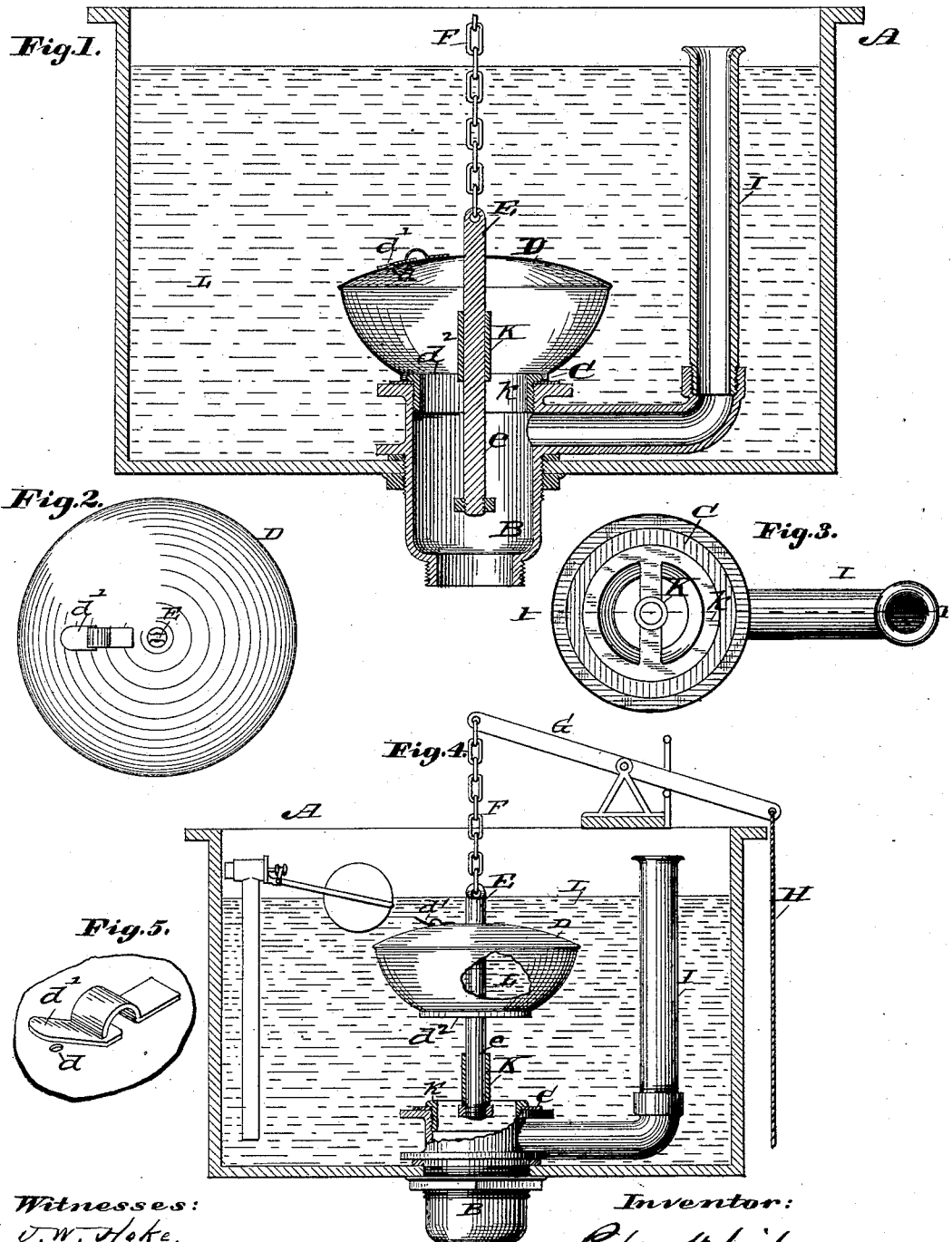

PETER WHITE, OF ST. LOUIS, MISSOURI.

TANK-VALVE.

SPECIFICATION forming part of Letters Patent No. 354,285, dated December 14, 1886.

Application filed October 4, 1886. Serial No. 215,293. (No model.)

*To all whom it may concern:*

Be it known that I, PETER WHITE, of St. Louis, Missouri, have made a new and useful Improvement in Tank-Valves, of which the following is a full, clear, and exact description.

The improvement relates to that class of tank-valves wherein the valve is made hollow to admit, when unseated, the water gradually from the tank, and thereby provide for the gradual seating of the valve, and, when seated, to discharge the water, leaving the valve in condition to be easily and promptly unseated. In such valves as hitherto constructed the air, as the water enters the valve, is discharged from the valve to without the water of the tank; that is, by means, say, of a tube extending from the valve to above the level at which the water stands in the tank, or by means of an air-passage leading from the valve into the pipe which discharges the water from the tank, the air, as the valve is unseated and the water from the tank passes through an opening in the bottom of the valve upward into the interior of the valve, escapes to some point without the body of water which surrounds the valve, and without in so doing coming in contact with the water. To prevent the air from escaping too freely from the interior of the valve, and thereby causing the valve to seat too abruptly, the air-passage is necessarily quite contracted, so much so that it is liable to become more or less clogged with dirt settling therein and the proper action of the valve thereby interfered with.

To provide a better method of discharging the air from the valve, as well as to simplify the construction generally, and to provide at the same time for venting the pipe by which the water is discharged from the tank, and also for an overflow of water in the tank, is the aim of the present improvement, which, in its most desirable form, is illustrated in the annexed drawings, making part of this specification, and in which—

Figure 1 is a vertical section of the tank and valve, the valve being seated, and the section of the valve being taken on the line 1 1 of Fig. 3. Fig. 2 is a plan of the valve. Fig. 3 is a plan of the valve seat. Fig. 4 is a vertical section similar to that of Fig. 1, but upon a smaller scale, and showing the valve unseated and in side elevation (partly broken away) and partly filled with water, as when the valve is about to be seated; and Fig. 5 is a detail, being a view in perspective of the device for discharging the air from within the valve.

The same letters of reference denote the same parts.

A represents any tank from which it is desired to discharge water or other liquid by means of a valve which needs to be promptly opened and gradually closed.

B represents the pipe through which the water is discharged from the tank.

C represents the valve-seat at the upper end of the pipe.

D represents the valve, which is adapted to seat at C and thereby cut off the discharge of the water from the tank into the pipe B. The valve, as stated, is hollow, to render it sufficiently buoyant to float when unseated, and until the water has entered and expelled the air from within it, whereupon its weight causes the valve to descend and be seated again. The valve is attached to the stem E, and by means of the chain F, lever G, and pull H the valve can be unseated.

I represents a pipe leading from above the level at which the water L should stand in the tank downward and connecting with the pipe B below the valve-seat C. The pipe I serves as an overflow-pipe for the tank, as an air-vent to the pipe B, and as a means for supplying air to the valve, for as soon as the water in the pipe B falls below the pipe I the air passes from the pipe I upward through the upper end of the pipe B into the interior of the valve.

The lower end, e, of the valve-stem E works in a guide, K, which is held in or made part of a ring, k, which in turn rests in the valve-seat C, as shown. The principal feature of the construction, however, is the provision for the escape of the air from the valve when it is unseated. In the upper portion of the shell of the valve is a small perforation, d, Figs. 1, 5, adapted to be closed by means of a valve, d', which opens upward into the water surrounding the valve, substantially as indicated in Fig. 4.

The operation of the improved valve is as follows: When the valve D seats, the valve $d'$ also seats, and the water within the valve D is drained into the pipe B, and the water surrounding the valve D is prevented by the valve $d'$ from passing through the perforation $d$ into the valve D. When the valve D is unseated, the water from the tank flows upward through the opening $d^2$ in the bottom of the valve D, and the air within the valve D is thereby expelled from the valve through the perforation $d$ directly into the water L of the tank. During this movement of the air the valve $d'$ opens, and as the air escapes the surrounding water, by coming in contact with the valve $d'$ and its seat around the perforation $d$, and by its passing (as it necessarily must in some degree) into the valve through the perforation $d$, operates to keep the valve and perforation free from dirt.

I claim—

1. The combination, with a tank for liquid, of an outlet-pipe for the liquid, an air-inlet for admitting air into said outlet-pipe, and a chambered valve for closing said outlet-pipe, provided with an air-outlet for discharging the air from the valve into the liquid of the tank, and with a liquid-inlet, that when the valve is unseated the liquid will pass from the tank into said valve, and when seated the liquid will pass therefrom into the outlet-pipe of the tank, substantially as described.

2. The combination, with a tank for liquid, of an outlet-pipe for the liquid, and a chambered valve for closing said outlet-pipe, the liquid being drained from said valve, when seated, into said outlet-pipe, and entering it from the tank when unseated, and the air being discharged from the valve into the liquid of the tank, substantially as described.

3. The combination, substantially as described, of the tank A, the outlet B, the seat C, the chambered valve D, the stem E, the connection F, and the pipe I, said valve D having the water-passage $d^2$ and the valved air-passage $d$, as described.

Witness my hand.

PETER WHITE.

Witnesses:
C. D. MOODY,
B. F. REX.